Patented May 25, 1943

2,320,232

UNITED STATES PATENT OFFICE 2,320,232

PROCESS OF MAKING 12-KETOSTEARAMIDE

William Edward Hanford and Richard Haven Wiley, Wilmington, Del., assignors to E. I. du Pont de Nemours & Company, Wilmington, Del., a corporation of Delaware No Drawing. Application July 18, 1940, Serial No. 346,142

3 Claims. (Cl. 260—404)

This invention relates to new and useful long-chain ketoamides and to their preparation.

It is an object of this invention to produce 12-ketostearamides, new and useful compositions of matter, and to provide simple, commercially practical methods for their production. Other objects will be apparent from the following description of the invention.

These objects are accomplished by treating either 12-ketostearic acid, its anhydride, its esters, or acid halides with ammonia, or primary or secondary amines, in the presence or absence of a catalyst, and isolating and purifying the resulting 12-ketostearamide.

By this process there are obtained compounds of the general formula:

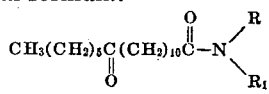

wherein either one or both of R and $R_1$ may be hydrogen or acyclic hydrocarbon radicals which may be unsubstituted or which may carry substituents; e. g., nitrile or carboxy groups, etc.

In the preferred embodiment of the invention an alcohol ester of 12-ketostearic acid, such as 12-ketostearin, is caused to react with excess anhydrous ammonia by heating in a closed reaction vessel for 4 to 8 hours at temperatures of 130° to 160° C. and at pressures of 500 to 1500 lbs./sq. in. A catalyst such as an ammonium salt may or may not be used. The crude 12-ketostearamide obtained after removal of ammonia is purified by recrystallization from a suitable solvent such as ethanol or 80 per cent aqueous acetic acid. The keto acid esters used in this invention may include 12-ketostearin, prepared as described in U. S. 2,178,760, or methyl-12-ketostearates, described in U. S. 2,180,730.

The following examples set forth certain well defined instances of the application of this invention. They are, however, not to be considered as limitations thereof, since many modifications may be made without departing from the spirit and scope of this invention. In these examples the amounts given are parts by weight, unless otherwise stated.

Example I

One hundred parts of 12-ketostearin was placed in a closed metal reaction vessel fitted with a mechanical stirrer and 50 parts of anhydrous ammonia was added through a suitable inlet valve. The reaction mixture was heated at 140° to 160° C. with stirring for 7 hours, a maximum gauge pressure of 800 to 1000 lbs./sq. in. being developed. The ammonia was then vented off and the molten mixture removed from the reaction vessel. This crude 12-ketostearamide was purified by recrystallization from 300 parts of hot ethanol using charcoal as a decolorizing agent. There was obtained 61.5 parts of pure 12-ketostearamide, melting at 120° to 122° C. Analysis: calculated for $C_{12}H_{33}O_2N$: N, 4.72; found: N, 4.55.

12-ketostearamide is a glistening, white substance occurring in the pure state as large waxy plates. It is soluble in the lower aliphatic alcohols and in acetic acid.

Example II

A mixture of 100 parts of 12-ketostearin, 1 part ammonium chloride, and 25 parts of anhydrous ammonia was heated in a closed reaction vessel for 4 hours with stirring at 130° C. After removal of the ammonia the crude 12-ketostearamide was purified by recrystallization from 80 per cent aqueous acetic acid. There was obtained 67 parts of pure 12-ketostearamide melting at 120° to 122° C.

Example III

A mixture of 100 parts of 12-ketostearin and 30 parts of anhydrous ammonia was heated in a closed reaction vessel with shaking for 5 hours at 150° C. The crude 12-ketostearamide thus obtained was purified by recrystallization from ethanol. The pure ketostearamide melted at 120° to 122° C.

Although the examples show the use of 12-ketostearin only, other esters of 12-ketostearic acid such as the methyl, butyl, amyl, octyl, dodecyl, etc., esters, the ethylene and diethylene glycol esters, etc., may be used. Instead of the esters, the free acid or its amide-forming derivatives, such as the anhydride or acid halide, may be used.

N-substituted 12-ketostearamides may be produced by using primary or secondary amines; e. g., methylamine, isobutylamine, diethylamine, etc., as amidating agents in place of ammonia.

The use of a catalyst is not essential although such substances as ammonium salts which are known to act as acids in liquid ammonia tend to promote the reaction. In general, the reaction proceeds satisfactorily at any temperature above 30° C., the preferred range being 130° to 160° C. Since the reaction is carried out in a closed vessel, the pressure developed is dependent upon the temperature employed. Any superatmospheric pressure is operable, the maximum pressure being restricted only by the mechanical limitations of the equipment used. Although use of only the theoretical amount of ammonia or amine is necessary, in practice it is preferred to use at least a 100% excess of ammonia or amine. The reaction times vary depending upon the other conditions used. In general, a period of 4 to 8 hours is suitable at temperatures of about 150° C., though a longer time is required if the reaction is carried out at lower temperatures.

The 12-ketostearamides may be purified by recrystallization from lower aliphatic alcohols, aromatic and paraffinic hydrocarbons or acetic acid (glacial or aqueous).

12-ketostearamide is useful as an intermediate in the preparation of 12-aminostearamide and 12-aminostearic acid, compounds which are valuable in the preparation of polymeric amides. In addition 12-ketostearamide is suitable for use in the compounding of water repellents, cosmetic creams, polishes and waxes. It may also serve as a useful intermediate for materials of pharmaceutical value, preservatives, insecticides, and bactericides, etc.

It is apparent that many widely different embodiments of this invention may be made without departing from the spirit and scope thereof and therefore the invention is not intended to be limited except as indicated in the appended claims.

We claim:

1. The process which comprises bringing a compound selected from the class consisting of the acid, the anhydride, the ester, and the halide of 12-ketostearic acid in admixture with a compound selected from the group consisting of ammonia and primary and secondary amines at a temperature between 30° C. and 160° C.

2. The process in accordance with claim 1 characterized in that it is carried out in the presence of an ammonium salt as a catalyst.

3. The process which comprises bringing a 12-ketostearic compound selected from the class consisting of the acid, the anhydride, the ester, and the halide into admixture with an excess of anhydrous ammonia under a pressure of between 500 and 1500 lbs./sq. in. and a temperature of about 130° to about 160° C., and recovering from the resulting reaction 12-ketostearamide.

WILLIAM EDWARD HANFORD.
RICHARD HAVEN WILEY.